United States Patent [19]

Püschel et al.

[11] 3,976,927

[45] Aug. 24, 1976

[54] CIRCUIT FOR THE ENERGIZATION OF AN ELECTRIC MOTOR WITH TIME DELAY

[75] Inventors: Siegfried Püschel, Aschaffenberg; Jan Turkowski, Obernburg, both of Germany

[73] Assignee: Linde Aktiengesellschaft, Wiesbaden, Germany

[22] Filed: Dec. 17, 1973

[21] Appl. No.: 425,614

[30] Foreign Application Priority Data

Dec. 22, 1972 Germany.............................. 2263039

[52] U.S. Cl................................ 318/421; 318/274; 318/391
[51] Int. Cl.².......................................... H02P 1/20
[58] Field of Search ........... 318/274, 276, 277, 391, 318/392, 403, 420–422

[56] References Cited
UNITED STATES PATENTS

| | | | |
|---|---|---|---|
| 2,769,131 | 10/1956 | Immel.............................. | 318/421 X |
| 3,012,178 | 12/1961 | Barrett, Jr........................ | 318/420 X |
| 3,515,970 | 6/1970 | Weiser............................. | 318/422 X |

*Primary Examiner*—James R. Scott
*Assistant Examiner*—W. E. Duncanson, Jr.
*Attorney, Agent, or Firm*—Karl F. Ross; Herbert Dubno

[57] ABSTRACT

An electric motor of the direct-current type, especially for automotive vehicles in which the motor is used for so-called motor braking in addition to normal drive, is energized through a time-delay network which ensures that excess voltage will not be applied prematurely. The time-delay network is rendered effective by a sensor responsive to the sense of rotation of the armature.

8 Claims, 5 Drawing Figures

CIRCUIT FOR THE ENERGIZATION OF AN ELECTRIC MOTOR WITH TIME DELAY

CROSS REFERENCE TO RELATED APPLICATIONS

This Application is related to the commonly assigned copending Application Ser. No. 240,475 filed April 3, 1972 and entitled TIME - DELAY SWITCH CIRCUITRY, ESPECIALLY FOR ELECTRICAL VEHICLES, now U.S. Pat. No. 3,884,318 issued May 20, 1975.

FIELD OF THE INVENTION

The present invention relates to the operation of direct-current electric motors, especially for motor-vehicle applications, in which the electric motor, is energized with successively higher voltages through a time-delay means adapted to prevent the application of a higher voltage at any instant than is tolerable by the motor in accordance with its back electromotive force (e.m.f.), and the speed of its armature.

BACKGROUND OF THE INVENTION

In the aforementioned copending application there have been described various circuits for providing a time delay between a direct current electric motor and an energizing source. In general, it has been found to be advantageous in the control of a direct current electric motor, i.e. the speed and torque thereof, to control the increase in voltage applied thereto by a time-delay means which maintains a minimum time interval between increases in the applied voltage.

Such circuits are employed because the application of an excessive high voltage, i.e. the application of a high voltage prematurely, at the terminals of the electric motor, causes a higher current to flow than is desirable and may result in burning out of the motor. The tolerable applied voltage thus is a function of the back e.m.f. resulting from rotation of the armature and hence the speed thereof. As a consequence the circuitry described above can avoid overenergization of the motor by delaying the application of the voltage increase, e.g. via the time-delay circuitry, until a sufficient back e.m.f. has developed or the armature has attained the requisite speed.

The time-delay networks become effective as soon as a potential is applied to the motor but problems are encountered when the motor is used for so-called motor braking.

In this operating mode kinetic energy of the vehicle is translated into rotation of the armature which is electromagnetically resisted by energization of the motor with a polarity that would, in the absence of this momentum, drive the motor in the opposite sense. In other words the armature rotates counter to its normal sense of rotation under the same polarity.

When the earlier time-delay systems were provided for a motor capable of motor braking, the time-delay networks permitted the applied voltage levels to become effective without limitation as long as the armature is inertially rotated in the opposite sense from that normally associated with the applied polarity. As soon as the armature came to standstill the time-delay networks, still conductive, applied high voltage directly to the motor so that a higher current flowed than was permissible, there having been no development of a sufficient back e.m.f. or opportunity for the armature to rotate in its normal sense.

As a consequence, in spite of the provision of time-delay switching to prevent application of prematurely high voltages, if such high voltages nevertheless are applied then there is a transition from direct-current or motor braking to normal drive operating unless, concurrently with the reduction of the armature speed to zero, there is a reduction in the applied potential. Frequently, the vehicle operator is incapable of creating this condition and motor burnout or other disruption of the system may occur.

OBJECTS OF THE INVENTION

It is the principal object of the present invention to provide control circuitry for the above described purposes which will avoid the stated disadvantages.

Another object of the invention is to provide a system for controlling a direct-current electric motor, selectively operable in a normal drive made and in a motor-braking mode, whereby overloading of the motor at the transition between the motor braking load and the normal drive mode cannot occur.

Another object of the invention is to provide control circuitry for an electric motor, particularly for a motor vehicle having time-delay switching of various voltages levels to the electric motor, such that the time-delay circuitry will be rendered effective for normal drive operations even upon a transition between a motor-braking mode and the normal drive mode.

It is also an object of the invention to provide a safety device or system to protect an electric motor from undesired circuitry conditions.

Yet another object of the invention is the provision of a system which will extend the principles originally set forth in the commonly assigned copending application mentioned earlier.

SUMMARY OF THE INVENTION

These object and other which will become apparent hereinafter are attained, in accordance with the present invention, by the provision of means which prevent the time delay networks or switches from being rendered effective (conductive) as long as the armature of the direct current motor is rotated in a sense opposite the normal drive sense and, especially, as long as the terminals of the armature develop a voltage drop representing that the motor is not in the normal drive mode, i.e. a potential drop which in polarity is opposite the potential drop across the armature in the normal drive mode.

Preferably, the circuit of the present invention is provided for the control of the direct-current electric motor of a vehicle, especially a vehicle using countercurrent braking. Such systems are especially effective for so-called floor vehicles for industrial purposes, i.e. fork-lift trucks and the like.

According to a feature of the present invention, there is connected across the armature of the motor an element responsive to the direction of the potential drop thereacross, the element, in turn, being so connection to the time-delay network or switch that it prevents the time-delay network or switch from becoming effective as long as the potential drop across the armature is not in a predetermined direction, sense or polarity and which renders the time-delay switch effective (enables the switch) when the potential drop of improbable polarity is extinguished, so that the time delay network becomes effective to control, the application of potential to the motor. Thus an excessive current loading and heat loading of the motor is precluded without negative effects upon the control characteristics of the motor or upon the drive characteristics of the vehicle.

In one embodiment of the circuit according to the invention, a relay is connection across the armature in series with a diode establishing the polarity-detecting characteristic, i.e. the directional characteristic to which the system responds. Of course, a so-called polarized relay can be employed in place of the series combination of a diode and non-directional relay, although it is preferred to provide a diode and a polarized relay in series for the present purposes.

When a simple relay and a diode in series therewith are employed, the energy requirements are greater to operate the polarity detector than with a polarized relay. The switching time is longer and the switching threshold is higher. A polarized relay without a series diode has the advantage that the relay is maintained under a reference potential so that energization can be effected with smaller energy consumption and more rapidly. Without a diode, however, this relay remains continuously energized and must be especially designed for this purpose. It is possible with a polarized relay to have spurious operation between the voltage generated by the motor during motor braking and hence the system using a polarized relay along to detect the polarity across the armature terminals is not as reliable. When the polarized relay is provided in series with a diode, continuous energizing current is excluded and the energy requirements are further reduced, while spurious response to the armature polarity is eliminated.

Preferably a capacitor is connected in parallel to the to dissipate inductively generated voltage peaks upon energization of the relay and attraction of its armature.

The circuit of the present invention need not make use of a relay to sense the polarity of the potential developed at the armature of the motor and it is, therefore, a feature of the present invention that a diode control network is provided which renders a transistor conductive when the potential drop across the armature is of such polarity that the motor is operating as a generator (motor braking). This transistor may directly or indirectly operate a further transistor or series of transistors to block the energization of the time-delay networks.

A diode circuit of this type can comprise a resistor connected to the positive pole of the voltage source and, in parallel with the field windings of the motor, a diode connecting the other terminal of this resistor with one side or terminal of the motor armature and being conductive in this direction. The junction between the diode and the resistor is connected by a path having a second diode forwardly poled to the base of a transistor whose emitter is connected to the negative terminal of the voltage source and whose collector is tied by another resistor to the positive voltage terminal.

Between the second diode and the negative pole for terminal of the voltage source, there are provided in parallel a resistor and a capacitor while, between the collector and its resistor, a diode is connected to the base of the second transistor. The emitter-base network of this transistor is provided with a further resistor and the emitter-collector terminals of this transistor are provided in shunt across the delay or time constant network of the time-delay circuit.

As described in the copending commonly assigned application Ser. No. 240,475 (U.S. Pat. No. 3,884,318), the time-delay circuit comprises a time-constant network (bridged by the emitter-collector terminals of the second transistor or by the relay contacts of the present invention) consisting of a resistor and a capacitor in series (R-C network) connected across the direct-current source, and a unijunction transistor whose emitter is connected to the tie point between the resistor and the capacitor of the R-C network.

The threshold-setting base of the unijunction transistor is connected to a voltage-divider network establishing the peak point value of the unijunction transistor and its other base is connected to the control electrode or gate of a thyristor or other solid-state switching device provided between the direct-current source and the load, i.e. the electric motor.

A switch is inserted between the source and the R-C network and voltage-divider network to initiate the switching process provided that the override control system of the present application enables the time-delay network to be effective. As a result, the unijunction transistor is a programmable switch which can be tripped at any desired threshold and hence automatically responds to variations in the supply voltage. It can thus be made to offset any thermal variations in the operating characteristics of the switch.

As is recognized, the unijunction transistor is a three-electrode device whose base-base network acts as a resistor triggered to a high conductivity state when the emitter potential reaches a level known as the peak-point voltage. The latter is established by the potential at the programmable or threshold base. The unijunction transistor has a negative temperature coefficient of conductivity and, when used with voltage-divider resistors of a positive temperature coefficient, can be temperature compensated without complex components. The R-C network allows the time constant of the system to be changed with ease.

The input electrode of the thyristor, which may be a three-element solid-state controlled rectifier (SCR), and the resistor of the R-C network are connected to one pole of the d-c source, while the capacitor and the output of the thyristor are connected to the other pole of the d-c source.

The thyristor, in the case of an SCR, has its anode connected to the positive terminal of the d-c source and its cathode connected to the negative terminal of the source, preferably through the load (electric motor) to be actuated by the time-delay switch. The load can be actuated indirectly, e.g. via a relay whose coil is interposed between the negative terminal of the d-c source and the cathode (and capacitor of the R-C network).

As described in the aforementioned copending application, the relay preferably is provided with contacts adapted to shunt resistors, or render resistors effective, in series with the windings of the electric motor which is the drive for an electrical vehicle, especially a warehouse-type vehicle such a forklift truck. The resistor of the R-C network and the anode of the thyristor are connected to the positive terminals of the d-c source and, preferably, lie in series with the switch which is operable to initiate the timing or sequencing of the application of successively higher potentials to the motor.

A diode may be bridged across the capacitor of the R-C network and thus can oppose reverse-current surges thereacross when the unijunction transistor and, consequently, the thyristor are triggered. The time-constant capacitor is thereby protected.

As has also been described in the aforementioned copending application, a plurality of such time-delay circuits may be provided in cascade with anode (input) of the thyristor of each subsequent circuit being connected to the d-c source while the time-constant network, unijunction transistor and voltage divider are connected to the cathode or output terminal of the previous thyristor stage.

The system is thus used to switch relays or like devices in sequence with a switching pattern or timing adjusted to the individual needs of each stage. Consequently, if initial acceleration is to proceed more slowly than in subsequent stages, the time constant of the earlier circuits may be increased relative to the time constant of a subsequent stage. Each individual stage can have a time constant which is individually established by the respective R-C network and which may be adjusted by incorporating a variable resistor as part of the resistance component of the network. The next stage will then only be energized after the lapse of the time period of the earlier stage.

The relays can be provided with switch contacts adapted selectively to bridge resistors in series with respective stages of a drive motor. The cascade circuitry may have one time-constant circuit connected to each of these resistors. Other stages may have relays which cut resistors into a circuit in parallel or in series as described in the aforementioned copending application.

The safety system of the present invention, which monitors the polarity of the potential drop across the armature, is thus preferably combined with an electronic time-delay switching circuit having a time-constant network formed by a resistor and a capacitor interposed between the poles of the direct-current source and preferably across the same direct-current source by which the motor is energized. Between the resistor and the capacitor, a conductive path extends to the emitter terminal of the programmable unijunction transistor whose first base terminal is tied to a junction between two resistors forming a voltage divider likewise connected across the terminals of the direct-current source. The second base of the unijunction transistor forms the output and is connected to the control gate of a thyristor whose anode is connectd to the same terminal of the source and is at the same polarity as the resistor of the aforementioned R-C network.

DESCRIPTION OF THE DRAWING

The above and other objects, features and advantages of the present invention will become more readily apparent from the following description, reference being made to the accompanying drawing in which.

SPECIFIC DESCRIPTION

Figure 4:
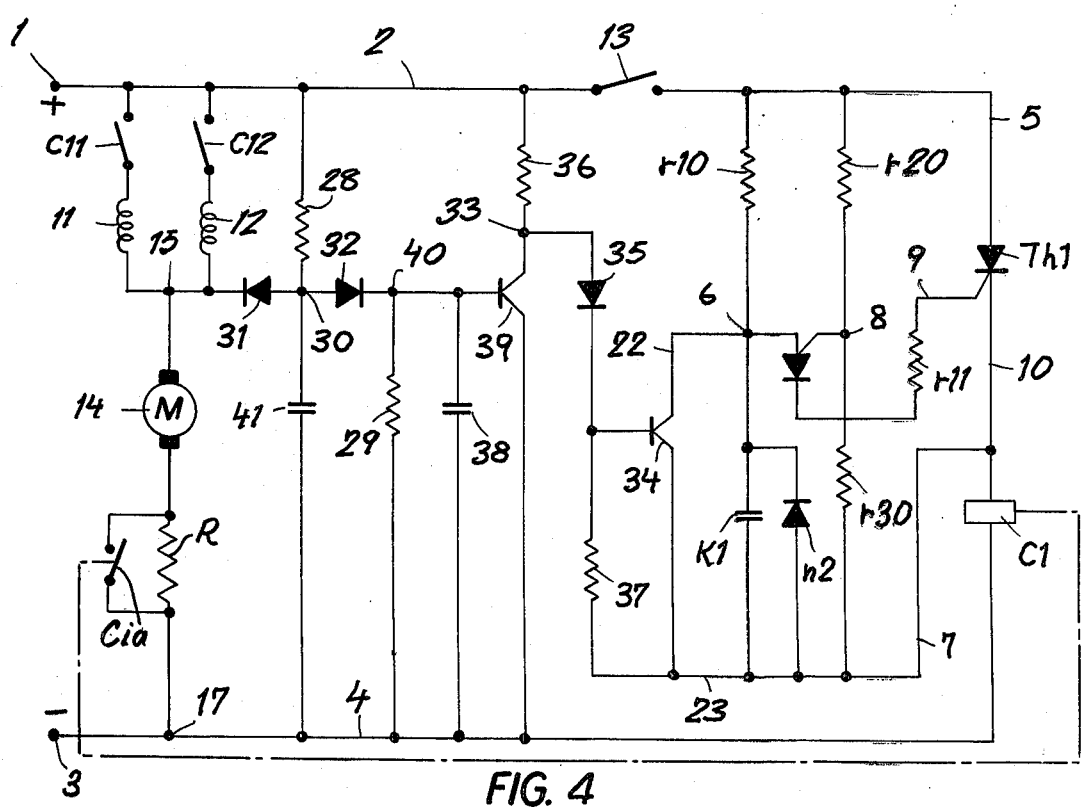
FIG. 4 is a circuit diagram illustrating another embodiment of the invention wherein a diode network constitutes the armature-polarity detector.
Figure 5:
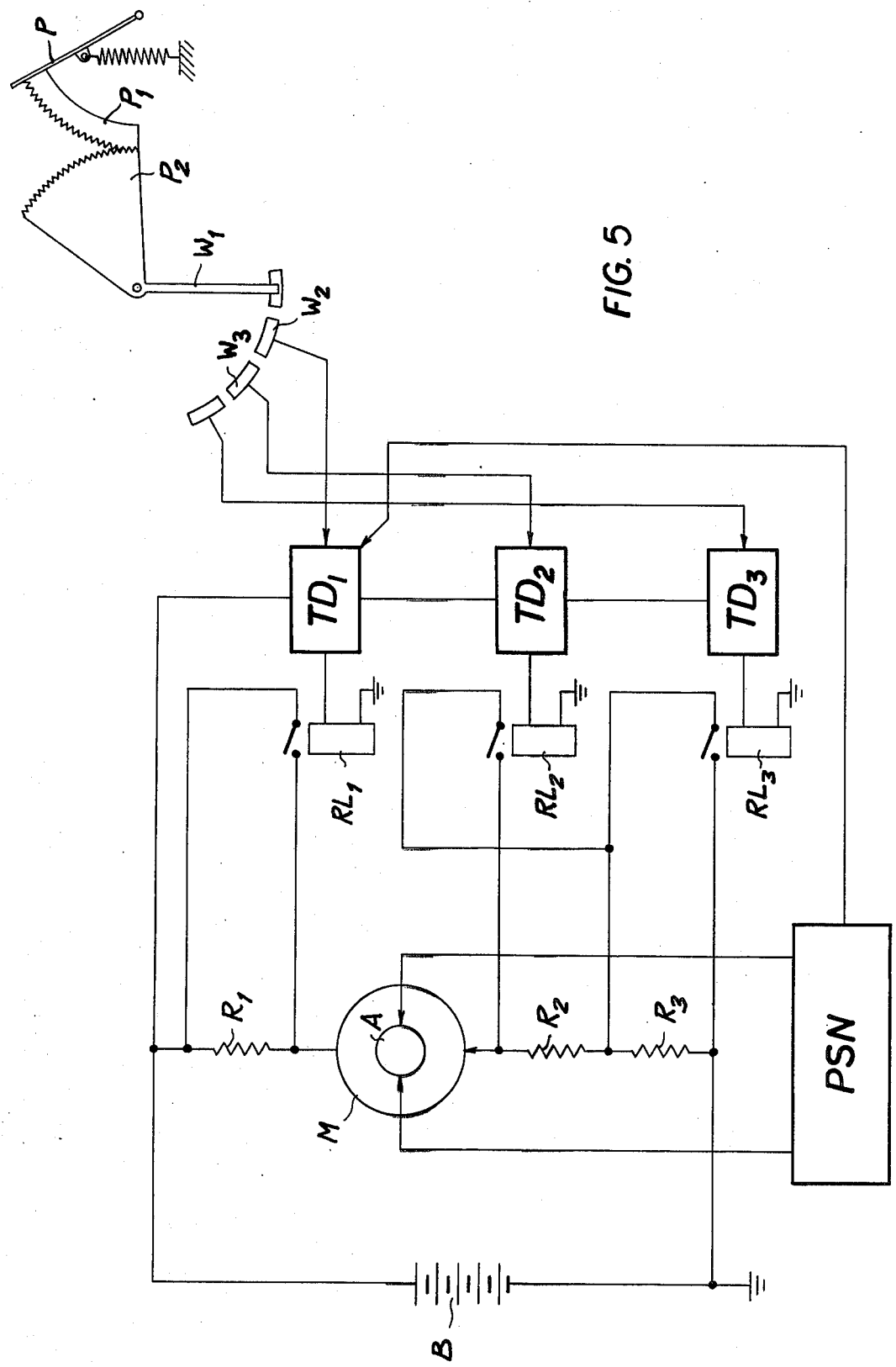
FIG. 5 is a block diagram illustrating the system according to the present invention whereby the principles may be more readily understood.

Referring first to FIG. 5, in which the simplified version of a motor control system of the general type described in the aformentioned copending application has been illustrated, it can be seen that the motor M of a fork lift can be energized from the battery B thereof through one, two or three resistors $R_1$, $R_2$, and $R_3$ by a plurality of time-delay networks $TD_1$, $TD_2$, $TD_3$ under the control of a pedal P. The time-delay netorks operate through relays $RL_1$, $RL_2$, $RL_3$ (corresponding to the relay C1) which, when energized, through contacts C1a respectively shunt the resistors $R_1$, $R_2$ and $R_3$ (corresponding to the resistor R of FIG. 4 or 25 in FIGS. 1–3).

Under the principles described in the aformentioned application, depression of the pedal P causes the sector $P_1$ to rotate the sector $P_2$ and bring the wiper $W_1$ into engagement with a switch contact $W_2$. This energizes the time-delay switching circuit $TD_1$ and after the lapse of a predetermined period after the motor M has been turned on, shunts the resistors $R_1$ and thus applies a higher potential to the motor to accelerate the latter. Assuming that the wiper $W_1$ has now reached contact $W_2$, the lapse of the first time period triggers the time-delay circuit $TD_2$ to energize relay $RL_2$ and shunt resistor $R_2$. The process is repeated for as many stages as are required. The armature A has its terminals connected to a polarity sensing network PSN which supplies a "signal" to the first time-delay circuit $TD_1$ Preventing it from becoming effective when the potential at the armature indicates that the motor is operating in a motor-braking or generator mode. The inactive time-delay circuit $TD_1$ also prevents the subsequent circuits $TD_2$, $TD_3$ from being activated.

The delay and sensing circuits may correspond to any of those of FIGS. 1–4.

Figure 1:
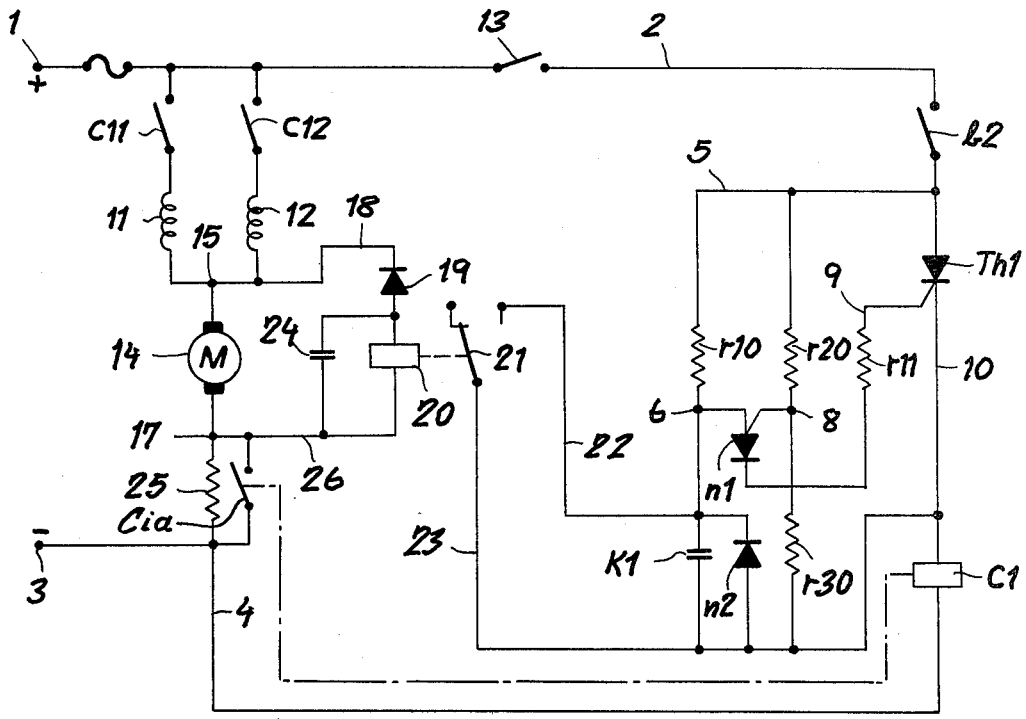
FIG. 1 is a circuit diagram of a system according to the present invention in which the time-delay circuit is of the type described in copending application Ser. No. 240,475 and has been illustrated only partly, while the armature-potential detector uses an ordinary relay and a rectifier in circuit therewith.

In FIG. 1, we have shown a circuit in which the polarity sensing network utilizes a simple relay. (In FIGS. 1–4 identical reference characters are used to represent identically functioning elements).

A bus bar 2 (positive bus) is connected to the positive terminal 1 of the direct-current source which may be a motor-powering battery as represented at B in FIG. 5. To the negative terminal 3 of this source, a return or negative bus 4 is connected.

Along the positive bus 2, there is provided a main switch 13 which turns on the motor. By the actuation of an operator-controlled lever, not shown in FIGS. 1–4, for example, the accelerator pedal P of FIG. 5, the motor can be turned on in a direction determined by the applied polarity via a switch $c11$ or $c12$.

Figure 2:
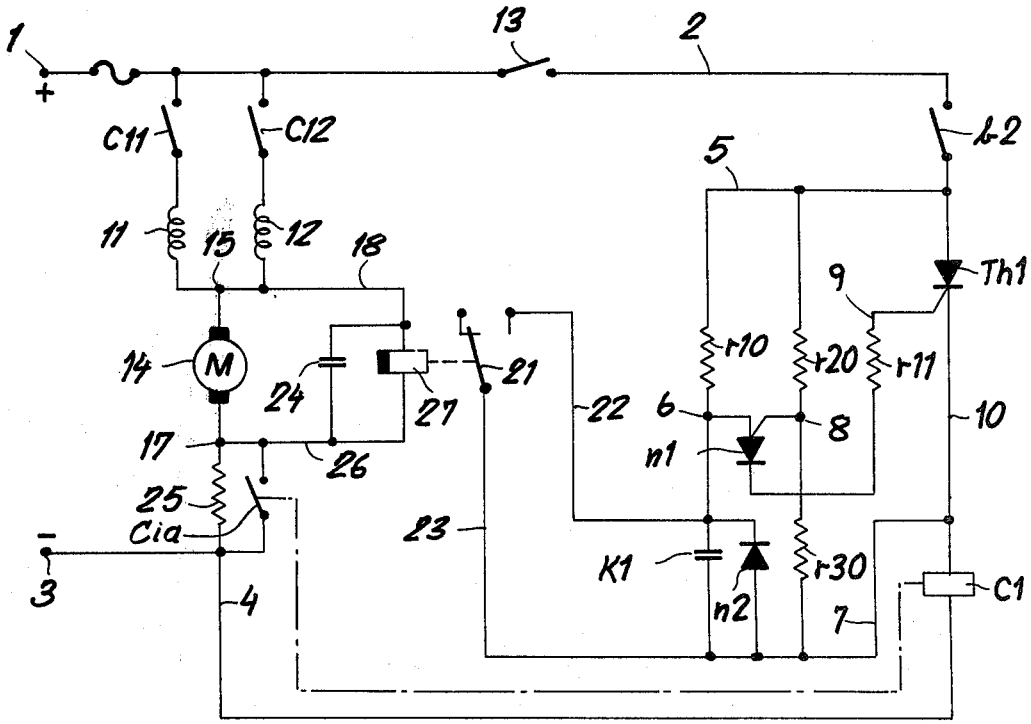
FIG. 2 is a diagram similar to FIG. 1 in which a polarized relay alone is employed in place of the ordinary relay and diode of FIG. 1.
Figure 3:
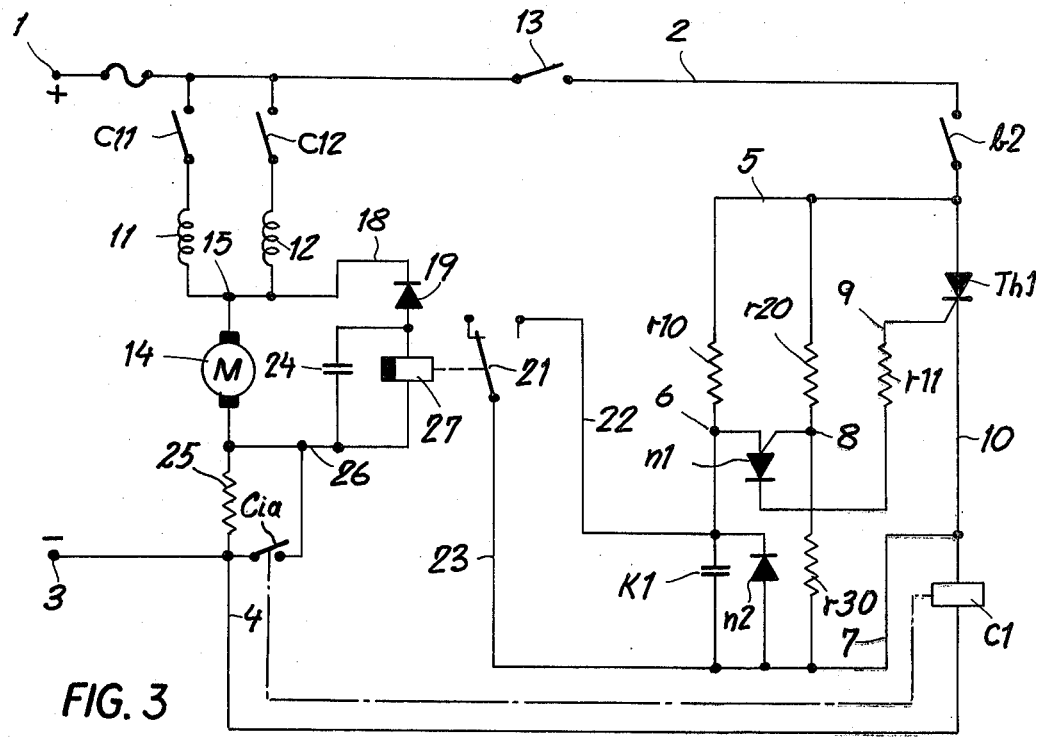
FIG. 3 is a diagram similar to FIG. 2 except that the polarized relay is provided in circuit with the rectifier diode.

Closure of a switch $b2$ represented by the contacts $W_1$, $W_2$, of FIG. 5 initiates the time delay at the lapse of which a relay coil $c1$ (corresponding to the relays $RL_1$, $RL_2$, $RL_3$) is energized to shunt a resistor represented at R in FIG. 4 or 25 in FIGS. 1–3 and apply a corresponding potential to the motor (see Ser. No. 240,475). The field windings of the latter are represented at 11 and 12 and are oppositely effective so that, with closure of the switch c11, the motor operates in one sense whereas with closure of the switch c12 the motor operates in the opposite sense.

As described in connection with FIG. 5 and in the aforementioned copending application, further resistors can be shunted at corresponding intervals to prevent overloading of the motor by the applied voltage.

Upon closure of the switch b2 the electric current flows from the positive bus 2 via the switch b2 through the conductor 5 and via the resistor r10 to the junction 6 of the resistor r10 with a capacitor k1. When the latter is in a nonshunted state, the capacitor charges to a level which appears at the junction 6 over a period determined by the time constant of the network formed by the ohmic resistance of resistor r10 and the capacitance of condenser k1. The other terminal of condenser k1 is connected via line 7 and the coil of relay c1 to the negative bus 4.

Across the conductors 5 and 7, respectively, positive and negative potential, there is connected a voltage divider consisting of a resistor r20 and a resistor r30, the common junction of which is represented at 8.

The junction 6 is connected to the emitter electrode of the programmable unijunction transistor n1 whose first base electrode is connected to the junction 8 of the voltage divider. As soon as the voltage across the condenser k1 reaches the threshold determined by the potential at junction 8 the unijunction transistor n1 becomes conductive.

A closed cicuit is thereby established from the condenser k1 via the junction 6, the transistor n1, conductor 9, the gate of the thyristor Th1, the conductor 10 and the conductor 7 across which the condenser k1 is discharged. Since the discharge current is applied through the control gate of the thyrister Th1, the latter is rendered conductive and permits current to flow from line 2 via the switch b2, the thyrister Th1, line 10 and the coil c1 of the resistor-shunting relay (see application Ser. No. 240,475). Energization of the coil c1 of the relay operates the contacts C1a thereof to shunt an appropriate resistor and apply an increased voltage to the motor with the corresponding time-delay, i.e. a time-delay determined by the magnitude of the resistor r10 and the capacitor k1. Line 9 includes a further resistor r11. Members r10, k1, n1, r30, r20 and Th1 thus form a time-delay switch or, when a plurality of such switches are provided, the first member of a sequence of time-delay switches of identical construction. Since the present invention is directed only to the initial activation of the time-delay sequence, the other switches, amply described in the above identified application be ignored. (If reference is now made again to FIG. 5, it will be seen that, where each time-delay switch $TD_1$, $TD_2$ . . . activates the next switch in the sequence, the polarity-sensing network need only control the first time-delay switch $TD_1$).

Moreover, the system of the present invention operates most simply by shunting the capacitance or condenser k1 when an improper polarity appears at the terminals of the armature. For this reason it is necessary to concern oneself only with the circuit elements between conductors 5, 7 and 10.

The electric motor comprises field windings 11 and 12 and an armature 14, all shown diagrammatically. The field windings are connected to a common terminal 15 with the armature at one side of the field windings and, at the other side thereof, are provided with the polarity-selector switches c11 and c12 mentioned previously. The windings may be opposite in sense so that both switches may be tied to the positive terminal 1 of the d-c source. The other terminal 17 of the armature 14 is connected to the negative terminal 3 of the source, e.g. by a resistor 25 across which a potential drop can be detected.

All of the aforedescribed elements are identical for the embodiment of FIGS. 1–4 to be further discussed below. In these embodiments, identically functioning elements have identical reference numerals.

In the circuit of FIG. 1, a conductor 18 is tied to the junction 15 and includes a diode 19 in series with the coil 20 of a relay, the coil being returned to the junction 17 so that the series combination of coil and diode lies across the armature 14.

The coil 20 may be part of a simple relay whose contacts 21 are connected by lines 22 and 23 across the capacitor k1 so that, in a de-energized state of coil 20, the capacitor is shunted. A condenser 24 is provided in parallel with the coil 20 to dissipate voltage peaks resulting from the switching operation.

In normal operation of the motor the potential at junction 15 is positive relative to the potential at junction 17 and hence conductor 18 is at a positive potential compared with the potential at conductor 26. Since the diode 19 is poled to block current flow in this condition, the coil 20 of the relay is not energized so that switch or contacts 21 are open. Conductors 22 and 23 are electrically separated from one another and capacitor k1 may receive an electric charge and can discharge during normal operation of the time-delay circuit.

However, should the motor 11, 12, 14 be driven inertially so that it acts as a generator and motor braking is effeected, a potential develops across the armature such that the junction 15 is more negative than the junction 17. Current flows through the series combination of the coil 20 and the diode 19 and the relay is thereby energized. As a consequence, contacts 21 close and no voltage appears at junction 6 of the unijunction transistor $D_1$ so that the latter cannot go conductive and the time-delay circuit is thereby prevented from operating.

Switch 21 remains closed only as long as the potential drop across terminals 15 and 17 represents generator operation of the motor. As soon as braking has terminated or the motor has been brought to standstill, the latter potential drop disappears, relay 20, 21 opens and capacitor k1 is permitted to charge. At this point, the time-delay circuit may be energized.

The circuit of FIG. 1 differs from that of FIG. 2 only in that the relay 21, 20 of FIG. 1 is replaced by a polarized relay 27, 21 such that the contacts 21 are open as long as the conductor 18 is more positive than the conductor 26. The switch contacts 21 of the relay remain closed as long as conductor 26 is more positive than conductor 18. The effect of this operation upon the capacitor k1 in dependence upon the potential drop between the junction 15 and 17 is the same as with the embodiment of FIG. 1.

The difference between these two embodiments is that the unpoled relay 20, 21 of FIG. 1 requires a higher energy consumption for operation of the relay, i.e. a signal of greater magnitude must be applied and thus the response time is longer with the system of FIG. 1 than the response time of the polarized relay 27, 21 of FIG. 2. The latter lies under a preapplied potential and thus can operate with a signal of smaller magnitude to respond more rapidly to a change in polarity between the junction 15 and 17. However, since the relay 27, 21 of FIG. 1 remains constantly under an applied potential, it continuously draws current.

These disadvantages of embodiments FIGS. 1 and 2 can be avoided by using the system illustrated in FIG. 3 in which a diode 19 is connected between a polarized relay coil 27 and the junction 15 in a reverse-poled sense. With this system, a current passes through the coil 27 of the relay 27, 21 only when the potential at junction 17 is more positive than the potential at junction 15. This potential drop is, however, always less than the potential developed between the junction 15 and 17 during normal drive operations of the motor so that the relay 27 only receives the smaller voltage and requires relatively less energy for switching. Furthermore, it requires a switching signal of low voltage or amplitude so that a relatively rapid response is obtained. The diode 19 protects the coil from large current flows in normal operation of the motor.

FIG. 4 shows a circuit according to the present invention in which the polarity of the armature is detected by diode system using a transistor amplifier and in which the output transistor acts as an electronic switch replacing the contacts 21 in shunt across the capacitor $k1$.

A voltage divider formed by a pair of series-connected resistors 28, 29 is bridged across the positive and negative busses 2 and 4, the resistor 28 lying parallel to the field coils 11 and 12 of the motor while the resistor 29 lies parallel to the armature 14 thereof.

The terminal 30 of the resistor 28 remote from the bus 2 is connected by a reverse-poled diode 31 to the junction 15 and the ohmic resistance of resistor 28 is made larger than that of the coils 11 and 12 so that, in normal operation of the motor, the potential at junction 15 is more positive than that at junction 30 and the diode 31 blocks current flow.

A forwardly poled diode 32 is connected between the junction 30 and the terminal 40 of resistor 29 remote from the bus bar 4. When this diode is conductive, a transistor 39, whose emitter is connected to the conductor 4, likewise becomes conductive, the transistor having its base connected to the junction 40. As long as transistor 29 is conductive, the negative potential of the bus 4 is applied by the conductor junction 33 across the resistor 36 to the base of transistor 34 to hold the latter blocking and thereby electrically disconnect conductors 22 and 23 from one another.

When the motor operates in a generator mode, the potential at junction 15 drops and a current flows through the resistor 28, the junction 30, and the diode 31 to the junction 15 with the effect that at junction 30 a potential develops which blocks diode 32. When the diode becomes blocking, a potential is applied at junction 40 across the resistor 29 which causes the transistor 39 to block. The positive potential thus applied to the base of transistor 34 through the diode 35 and across the resistor 36 renders transistor 34 conductive to connect lines 22 and 23 and thus short-circuit the capacitor $k1$. The operation of the time delay switch is thereby inhibited. Only when the voltage at junction 15 again increases (representing termination of motor braking) will the diode 31 block and the diode 32 becomes conductive so that the earlier state can be resumed in which the transistor 34 is blocked and the capacitor $k1$ can be charged. The resistors 36 and 37 form a voltage divider which determines the potential applicable to the transistor 34 and preventing the application of full operating voltage thereto. Capacitors 38 and 39 serve to dissipate voltage peaks on switching and prevent oscillations from developing in the systems.

We claim:

1. In a system for controlling a direct-current electric motor having a time-delay circuit for applying an operating potential to said motor after the lapse of a predetermined period following energization of said circuit, an armature across which a potential of normal polarity is operable during normal drive of the motor and an opposite potential develops when the motor operates in a generator mode, and a direct-current source for energizing said motor, the improvement which comprises:

a polarity-sensing network connected across said armature for detecting the polarity of the potential developed thereacross; and a control network electrically connected to said time-delay circuit for rendering same effective upon the detection by said polarity-sensing network of a potential across said armature representing operation of said motor in said generator mode, said polarity-sensing network including a coil of a relay connected across said armature, and said control network including at least a pair of contacts of said relay, and a diode connected in series with said relay across said armature.

2. The improvement defined in claim 1 wherein said relay is a polarized relay.

3. In a system for controlling a direct-current electric motor having a time-delay circuit for applying an operating potential to said motor after the lapse of a predetermined period following energization of said circuit, an armature across which a potential of normal polarity is operable during normal drive of the motor and an opposite potential develops when the motor operates in a generator mode, and a direct-current source for energizing said motor, the improvement which comprises:

a polarity-sensing network connected across said armature for detecting the polarity of the potential developed thereacross; and a control network electrically connected to said time-delay circuit for rendering same effective upon the detection by said polarity-sensing network of a potential across said armature representing operation of said motor in said generator mode, said polarity-sensing network including a coil of a relay connected across said armature, and said control network includes at least a pair of contacts of said relay, said relay being a polarized relay.

4. The improvement defined in claim 3, further comprising a capacitor connected across the relay coil.

5. In a system for controlling a direct-current electric motor having a time-delay circuit for applying an operation potential to said motor after the lapse of a predetermined period following energization of said circuit, an armature across which a potential of normal polarity is operable during normal drive of the motor and an opposite potential develops when the motor operates in a generator mode, and a direct-current source for energizing said motor, the improvement which comprises:

a polarity-sensing network connected across said armature for detecting the polarity of the potential developed thereacross; and a control network electrically connected to said time-delay circuit for rendering same effective upon the detection by said polarity-sensing network of a potential across said armature representing operation of said motor in said generator mode, said control network including a transistor switch having emitter-collector terminals connected across a timing-control element of said time-delay circuit, and a transistor amplifier for operating said transistor switch.

6. The improvement defined in claim 5 wherein said polarity-sensing network comprises a diode arrangement connected between said armature and said transistor amplifier.

7. The improvement defined in claim 6 wherein said diode arrangement includes a reverse-poled diode connected in series with a resistor across the windings of said motor between one terminal of said source and a terminal of said armature, a forwardly-poled diode connected between the junction of the first-mentioned diode and said resistor to the base of the amplifier transistor, and a further resistor connected between the base of said amplifier transistor and the other terminal of said source, the transistor of said switch having its base connected to the collector of the amplifier transistor through a further diode.

8. In a system for controlling a direct-current electric motor having a time-delay circuit for applying an operation potential to said motor after the lapse of a predetermined period following energization of said circuit, an armature across which a potential of normal polarity is operable during normal drive of the motor and an opposite potential develops when the motor operates in a generator mode, and a direct-current source for energizing said motor, the improvement which comprises:

a polarity-sensing network connected across said armature for detecting the polarity of the potential developed thereacross; and a control network electrically connected to said time-delay circuit for rendering same effective upon the detection by said polarity-sensing network of a potential across said armature representing operation of said motor in said generator mode, said time-delay circuit comprising a resistor connected in series with a capacitor across said source and forming a time-constant network, a unijunction transistor having a first base connected to the junction of a pair of series resistors bridged as a voltage divider across said source, an emitter connected to the junction between the resistor and capacitor of said time-constant network, and a second base connected to the gate of a thyristor interposed between said source and a relay controlling the energization level of said motor, said control member being connected across said capacitor to shunt the same upon detection by said polarity-sensing network upon said potential across said armature representing operation of said motor in said generator mode.

* * * * *